(12) United States Patent
Humphrey et al.

(10) Patent No.: US 7,492,306 B2
(45) Date of Patent: Feb. 17, 2009

(54) BOUNDARY CROSSING OBJECT DETECTION SYSTEM

(75) Inventors: Denver Humphrey, Antrim (GB); Bryan Clarke, Dublin (IE)

(73) Assignee: TDK Corporation, Tokyo (JP)

( * ) Notice: Subject to any disclaimer, the term of this patent is extended or adjusted under 35 U.S.C. 154(b) by 44 days.

(21) Appl. No.: 11/387,884

(22) Filed: Mar. 24, 2006

(65) Prior Publication Data

US 2007/0222663 A1  Sep. 27, 2007

(51) Int. Cl.
- *G08B 13/181* (2006.01)
- *G08B 13/18* (2006.01)
- *G01S 13/04* (2006.01)
- *G01S 13/00* (2006.01)

(52) U.S. Cl. .......................... 342/28; 342/27; 342/147; 342/149; 342/175; 342/195; 340/500; 340/540; 340/541; 340/552; 340/554; 340/565; 340/567

(58) Field of Classification Search ................ 342/27, 342/28, 59, 82–103, 175, 195, 70–81, 118, 342/134–147, 149–158, 192–194, 196–197; 340/540, 541–567, 901–904, 500; 701/300, 701/301

See application file for complete search history.

(56) References Cited

U.S. PATENT DOCUMENTS

| | | | |
|---|---|---|---|
| 3,882,494 A | | 5/1975 | Bolger |
| 3,889,181 A | | 6/1975 | Greer |
| 4,028,690 A | | 6/1977 | Buckley et al. |
| 4,054,871 A | | 10/1977 | Terrell et al. |
| 4,132,988 A | * | 1/1979 | Blacksmith et al. .......... 340/552 |
| 4,197,537 A | | 4/1980 | Follen et al. |
| 4,286,260 A | | 8/1981 | Gershberg et al. |
| 4,382,291 A | | 5/1983 | Nakauchi |
| 4,543,577 A | * | 9/1985 | Tachibana et al. ........... 340/904 |
| 4,549,181 A | * | 10/1985 | Tachibana et al. .......... 340/904 |
| 4,692,764 A | * | 9/1987 | Bonar ......................... 342/71 |
| 5,150,099 A | | 9/1992 | Lienau |
| 5,268,698 A | * | 12/1993 | Smith et al. ................. 340/552 |
| 5,712,640 A | * | 1/1998 | Andou et al. ................ 342/70 |
| 6,208,248 B1 | | 3/2001 | Ross |

(Continued)

FOREIGN PATENT DOCUMENTS

EP    1 420 270 A1    5/2004

(Continued)

OTHER PUBLICATIONS

"North American Radar"; no author listed; no date given; on the Internet at mysite.wanadoo-members.co.uk.*

(Continued)

*Primary Examiner*—Bernarr E Gregory
(74) *Attorney, Agent, or Firm*—Oliff & Berridge, PLC

(57) ABSTRACT

An boundary monitoring apparatus comprising an object detection device arranged to transmit a signal into a detection region and to detect an object in said detection region upon receipt of a reflected signal from said object; means for defining a boundary in said detection region; means for determining a path of said object in the detection region; means for performing an evaluation of the determined path of the object with respect to the boundary; and means for causing an alarm event depending on the evaluation.

20 Claims, 11 Drawing Sheets

U.S. PATENT DOCUMENTS

| | | | |
|---|---|---|---|
| 6,307,475 B1 * | 10/2001 | Kelley | 340/554 |
| 6,400,307 B2 * | 6/2002 | Fullerton et al. | 342/28 |
| 6,452,534 B1 * | 9/2002 | Zoratti et al. | 340/70 |
| 6,509,863 B2 * | 1/2003 | Zoratti et al. | 342/70 |
| 6,573,857 B2 * | 6/2003 | Fullerton et al. | 342/28 |
| 6,614,384 B2 * | 9/2003 | Hall et al. | 342/28 |
| 6,710,736 B2 * | 3/2004 | Fullerton et al. | 342/28 |
| 6,819,283 B2 * | 11/2004 | Okai et al. | 342/70 |
| 6,822,604 B2 * | 11/2004 | Hall et al. | 342/28 |

FOREIGN PATENT DOCUMENTS

| | | |
|---|---|---|
| EP | 1 449 726 A1 | 8/2004 |
| GB | 2073533 A * | 10/1981 |
| GB | 2139035 A * | 10/1984 |

OTHER PUBLICATIONS

"NORAD Operations Centre: Cheyenne Mountain Colorado"; no author listed; no date given; on the Internet at mysite.wanadoo-members.co.uk.*

* cited by examiner

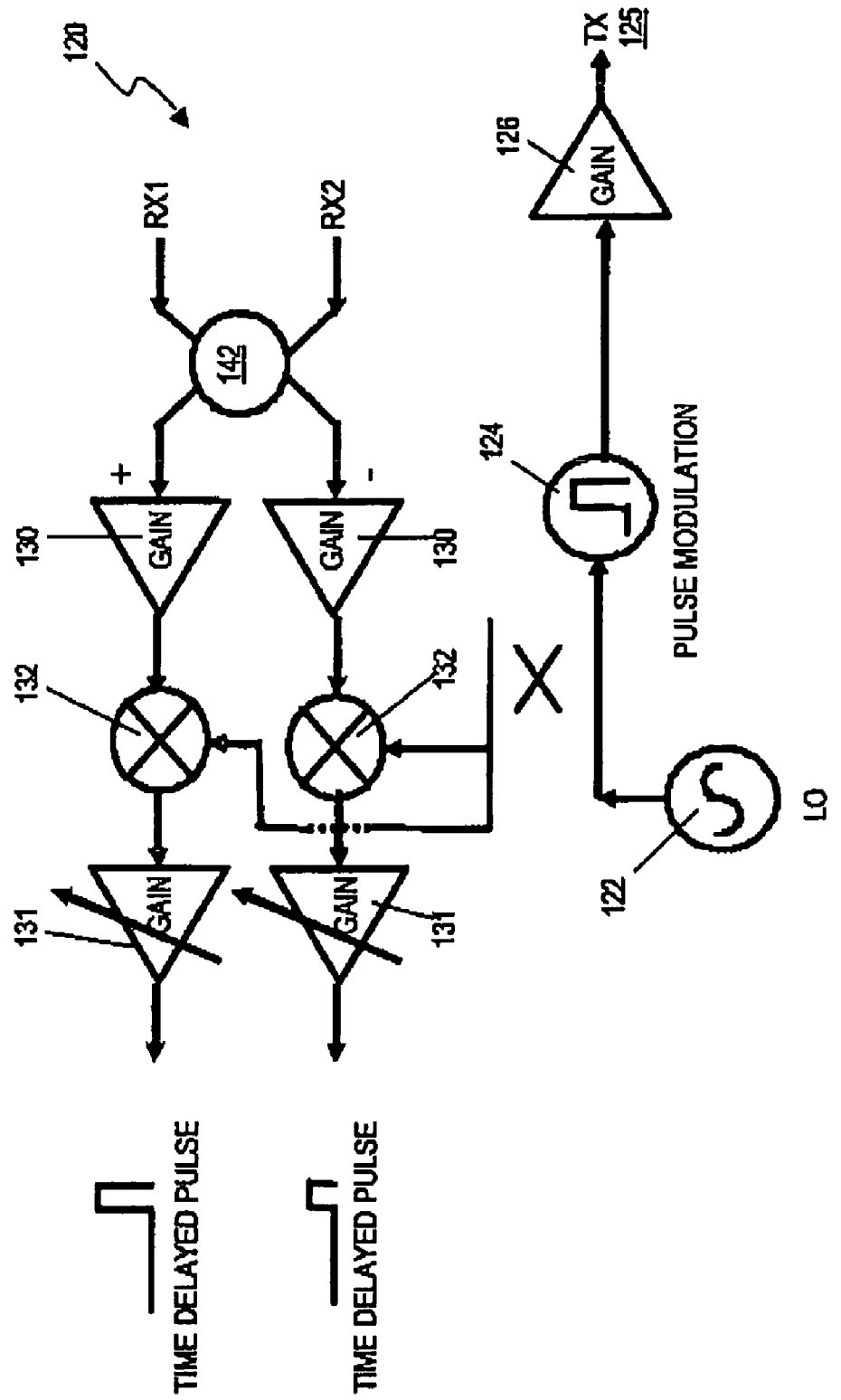

BOUNDARY CROSSING OBJECT DETECTION SYSTEM

FIELD OF THE INVENTION

The invention relates to systems, especially radar systems, for detecting objects using electromagnetic waves. In particular, the invention relates to a boundary or perimeter crossing object detection apparatus and system

BACKGROUND TO THE INVENTION

Radar systems typically include means for transmitting an electromagnetic wave from and means for receiving a reflected signal produced when the transmitted signal is reflected by any object present in the direction of transmission. Radar systems may be used in boundary or perimeter systems, for example intruder detection systems, where it is desired to detect if an object, for example a person, crosses a boundary or perimeter.

A problem with conventional perimeter systems is that they can be prone to false or undesired detections. For example, with conventional systems a detection may occur where an object is moving away from the protected area and/or where an object traverses only the periphery of the area. It is not necessarily desirable for such detections to cause an alarm. Also, conventional systems tend to have blind spots, especially where the protected area is rectangular.

It would be desirable to provide a system that mitigates some or all of these problems.

SUMMARY OF THE INVENTION

A first aspect of the invention provides a boundary monitoring apparatus comprising: an object detection device arranged to transmit a signal into a detection region and to detect an object in said detection region upon receipt of a reflected signal from said object; means for defining a boundary in said detection region; means for determining a path of said object in the detection region; means for performing an evaluation of the determined path of the object with respect to the boundary; and means for causing an alarm event depending on the evaluation.

In preferred embodiments, the reflected signal is received during use by said object detection device at an incident angle, the apparatus including means for determining said incident angle.

The apparatus preferably includes means for determining a distance of said object from said object detection device, and wherein determination of said path by said path determining means is based on respective incident angles and corresponding distances determined for said object over time.

In preferred embodiments, the object detection device comprises a radar device. The radar device may comprise first and second receiving antennas each receiving, in use, a respective reflected signal from a detected object; and a summation and subtraction unit for summing and subtracting the respective reflected signals to produce, respectively, a sum reflected signal and a difference reflected signal. Typically, an incident angle for the detected object is determined from a ratio of said sum reflected signal and said difference reflected signal.

The path determining means is conveniently arranged to determine a linear, or substantially linear, path for said detected object.

The evaluation performing means is typically arranged to determine if the determined path of said object intersects with said boundary. Preferably, evaluation performing means is arranged to determine a distance of the determined path of said object from said object detection device or other reference location, and wherein said alarm event causing means causes an alarm event if the path of the object is determined to intersect said boundary and if said determined distance of the path is less than a threshold value.

In preferred embodiments, the evaluation performing means is arranged to determine an angle of inclination, or incidence, of the determined path of said object from a reference axis, and wherein said alarm event causing means causes an alarm event if the path of the object is determined to intersect said boundary and depending on said determined angle of inclination, or incidence.

Preferably, the apparatus includes means for defining a post-boundary region beyond said boundary with respect to said object detection device, the apparatus being arranged to monitor the movement of objects detected in the post-boundary region.

Preferably, the apparatus includes means for defining a pro-boundary region between said boundary and said object detection device, the apparatus being arranged to monitor the movement of objects detected in the pre-boundary region.

Advantageously, in respect of an object first detected outside of said boundary, said evaluation performing means is arranged to determine if said determined path indicates that said object is travelling towards the apparatus.

Preferably, in respect of an object first detected inside of said boundary, said evaluation performing means is arranged to determine if said determined path indicates that said object is travelling away from the apparatus.

The apparatus may further include means for adjusting a size threshold for detectable objects.

A second aspect of the invention provides a method of monitoring a boundary in an apparatus comprising an object detection device arranged to transmit a signal into a detection region and to detect an object in said detection region upon receipt of a reflected signal from said object, the method comprising defining a boundary in said detection region; determining a path of said object in the detection region; performing an evaluation of the determined path of the object with respect to the boundary; and causing an alarm event depending on the evaluation.

Further advantageous aspects of the invention will become apparent to those ordinarily skilled in the art upon review of the following description of a specific embodiment and with reference to the accompanying drawings.

BRIEF DESCRIPTION OF THE DRAWINGS

Embodiments of the invention are now described by way of example and with reference to the accompanying drawings in which:

FIG. 3 is a schematic view of an angular tracking pulsed radar system;

DETAILED DESCRIPTION OF THE DRAWINGS

Figure 1:
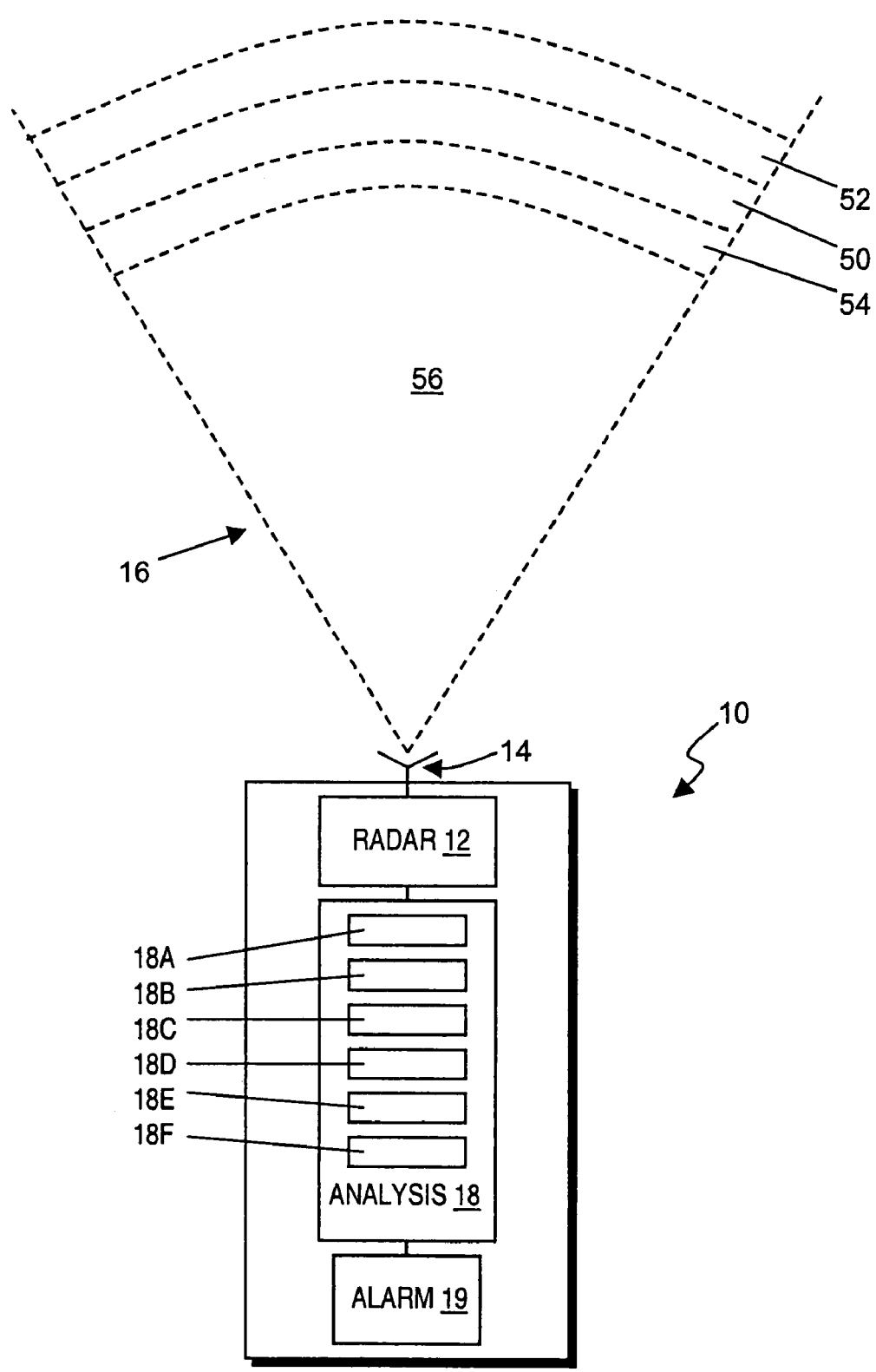
FIG. 1 is a schematic view of a boundary crossing detection apparatus embodying the invention.

Referring now to FIG. 1 of the drawings, there is shown, generally indicated as 10, a boundary or perimeter crossing detection apparatus or system embodying the invention. The apparatus 10 comprises an object detection device or sensor 12 typically in the form of a radar device. The sensor 12 transmits signals, electromagnetic signals and in particular RF signals (including microwaves) in the case of radar, from an antenna 14 into a detection field Or region 16. Objects (not shown) present in the detection region 16 cause the transmitted signals to be reflected, and the reflected signals are received by the sensor 12. Only one antenna 14, which may serve both as a transmit and receive antenna, is shown in FIG. 1, but it will be understood that one or more separate transmit and receive antennas may be provided.

Figure 2:
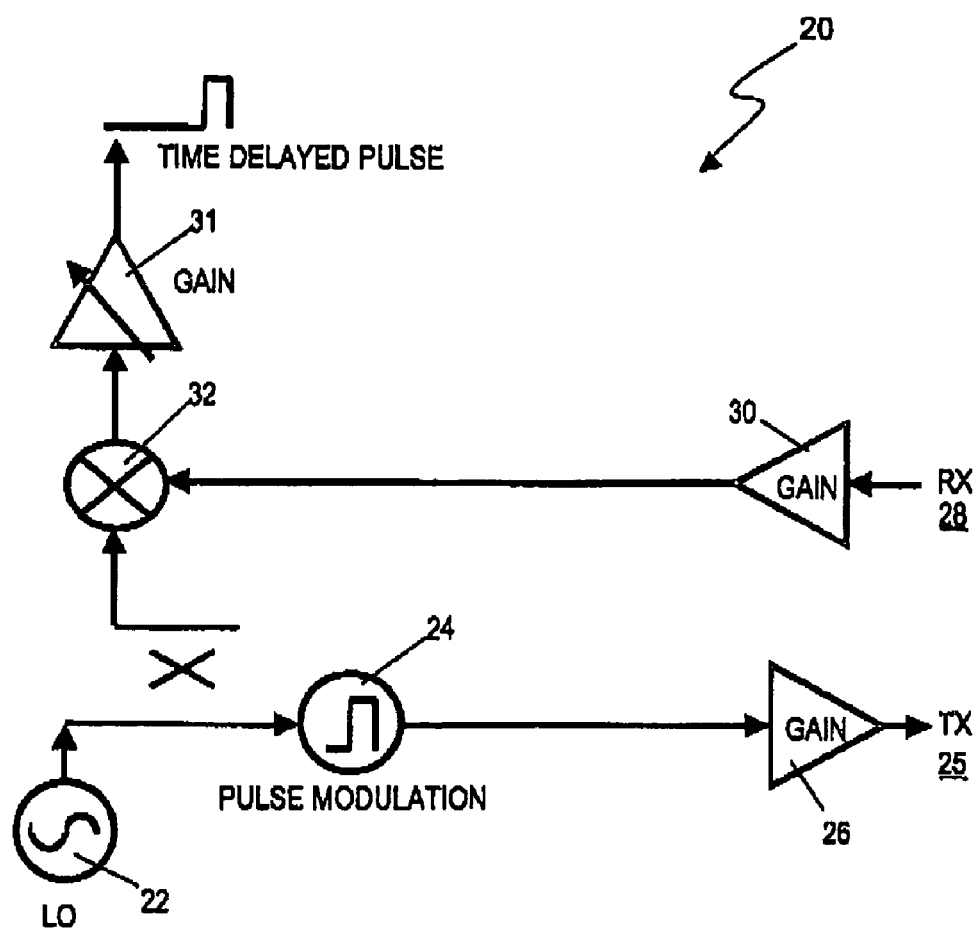
FIG. 2 is a schematic view of a pulsed radar system.

The basic operation of a radar sensor or system can be understood by considering a basic pulsed radar system 20 as shown in FIG. 2. An RF (Radio Frequency) signal from a local oscillator (LO) 22 is modulated by a pulse signal at modulation unit 24. This results in small bursts of Electromagnetic (EM) radiation at the pulse repetition frequency. The frequency spectrum produced by these bursts comprises frequency components above and below the LO frequency, at least some of the frequency components being offset from one another by an amount equal to the pulse repetition frequency. Within a given bandwidth, there can be a relatively large number of frequency components if a sharp or narrow pulse is used at modulation unit 24, or a relatively small number of frequency components if a wider or longer pulse is used. The pulse modulated EM signal is transmitted from the system 20 by a transmit (TX) antenna 25, usually after having been gain adjusted by a gain amplifier 26.

When the transmitted signal is reflected back to the system 20 by a object (not shown) in the path of the transmitted signal, the reflected signal is received by a receive (RX) antenna 28, after which the received signal is usually gain adjusted by a gain amplifier 30. The received signal is provided to a mixer component 32 whereupon the LO signal is de-modulated from the pulse signal. The demodulated signal is usually amplified by a variable gain amplifier 31. When the de-modulated pulse signal is inspected in the time domain (e.g. by display on a CRO) it may be observed that the de-modulated pulse signal is time delayed with respect to the pulse signal at the transmit side of the system 20. The time delay corresponds to the distance travelled by the transmitted signal before it was received at the RX antenna 28, and so the distance to the object can be determined.

FIG. 3 shows an alternative radar sensor or system 120 which is a modified version of the radar sensor shown in FIG. 1 and in which like numerals are used to indicate like parts.

The system 120 includes two receive (RX) antennas RX1, RX2 and means for summing and for subtracting the respective signals received by antennas RX1, RX2. The summing and subtracting means may be provided by separate units but are shown in FIG. 3 in the form of a common unit 142. The summing and subtracting unit 142 provides a first output signal (indicated as + in FIG. 3) which comprises the sum of the respective signals received at RX1 and RX2, and a second output signal (indicated as − in FIG. 3) which comprises the difference of the respective signals received at RX2 and RX1. The summing and subtracting unit 142 is typically provided before the signals are provided to the mixer 132 and any amplifiers 130, 131. The ratio of the amplitude of the first and second signals gives an indication of the angle of incidence of the reflected signal at the system 120. Hence, the system 120 may be referred to as an angle, or angular, tracking radar system. In the present example, the angle of incidence is assumed to be measured in a horizontal plane with respect to a reference axis which, typically, is a "straight ahead" line-of-sight from the system 120 (or the respective bore sight of the antennas RX1, RX2). The angle is referred to here as an azimuth angle.

Figure 4A:
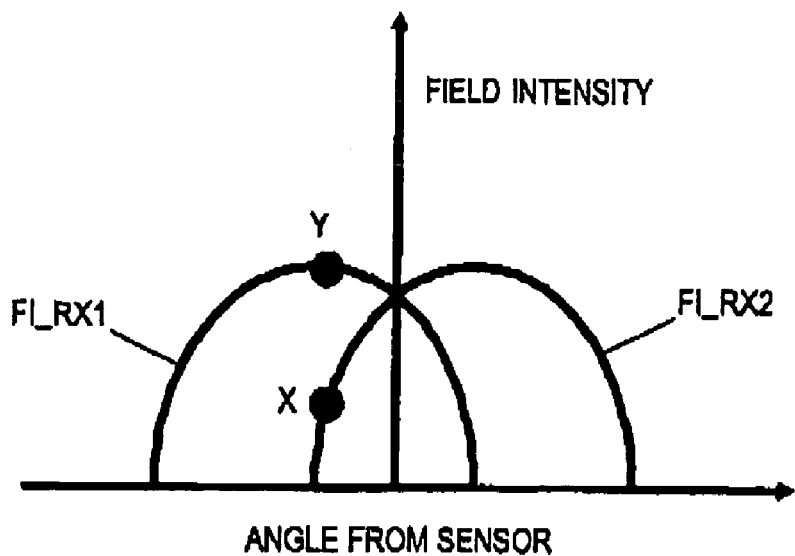
FIG. 4A is a graph illustrating the field intensity of respective signals received by a respective antenna in the system of FIG. 3.
Figure 4B:
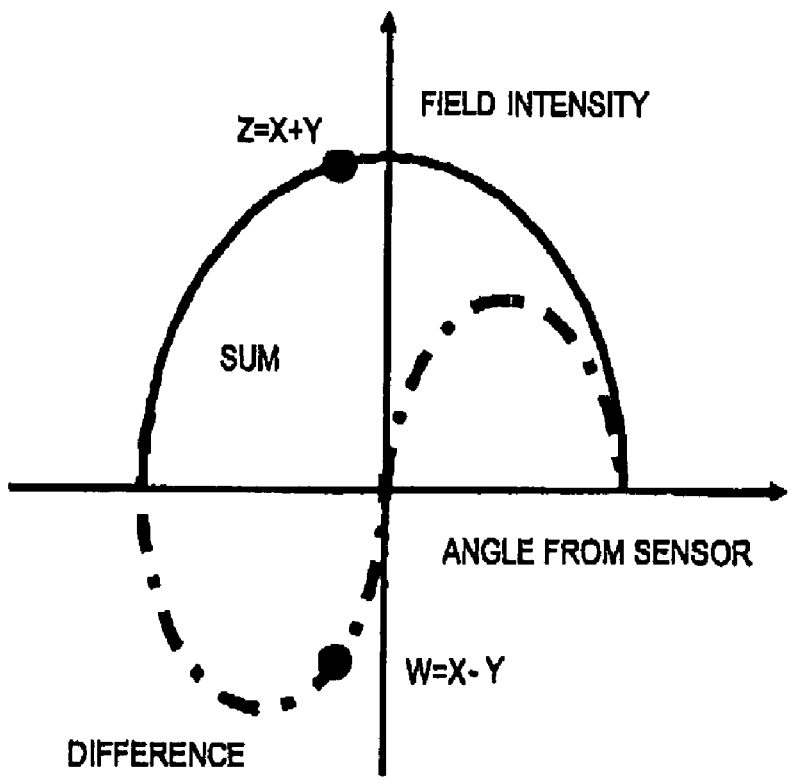
FIG. 4B is a graph illustrating the sum of, and difference between, the respective field intensities of FIG. 4A.
Figure 4C:
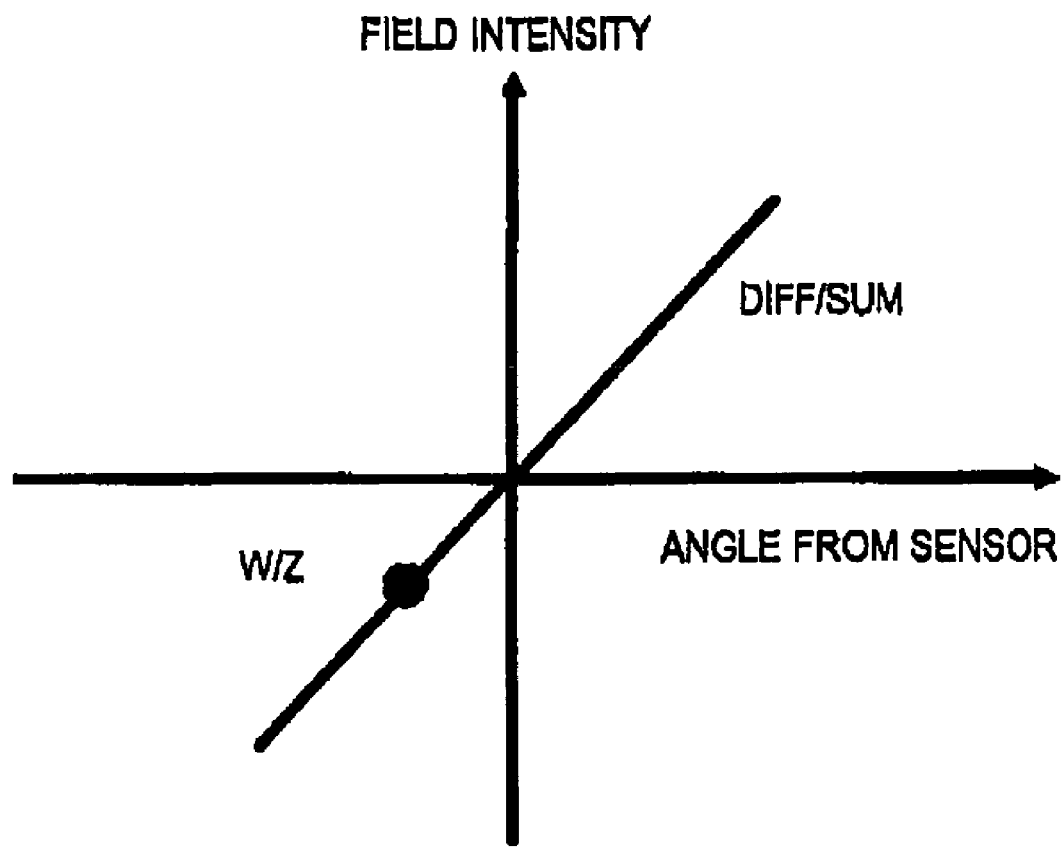
FIG. 4C is a graph illustrating the ratio of the sum of and difference between, the respective field intensities of FIG. 4A.

FIGS. 4A to 4C illustrate how the angle may be determined. FIG. 4A shows respective plots FI_RX1, FI_RX2 of the respective strength or field intensity of the respective signals received at each of the receive antennas RX1, RX2 against the angle of incidence of the received signals, for a target at a fixed distance from the sensor 12/antenna. FIG. 4B shows respective plots SUM, DIFFERENCE of the summed and subtracted field intensities FI_RX1, FI_RX2 against angle of incidence. FIG. 4C plots the ratio of DIFFERENCE over SUM. FIG. 4C shows that when the ratio of the difference and sum characteristics is plotted, a linear curve is obtained. Thus, the ratio corresponds to a specific angle from the sensor's bore sight For illustration purposes a point at a specific incident angle is considered. The respective field intensities at this angle are shown in FIG. 4A as X and Y and the respective summed and subtracted values are shown as Z and W on FIG. 4B. By calculating the ratio W/Z, the incident angle can be determined from FIG. 4C. In this example, W/Z is shown to indicate an angle on the left of the sensor.

The example systems 20, 120 shown in FIGS. 2 and 3 include only a single channel. To help distinguish objects more clearly, complex, or IQ (In phase Quadrature), de-modulation is often used wherein there are two channels, usually referred to as I and Q, the I and Q channels being in quadrature with one another. The main principle of operation in each channel is generally the same as that described with reference to FIGS. 2 and 3.

In preferred embodiments, the detection device, or sensor 12, of the apparatus 10 comprises an angle detecting radar system, and in particular a pulse or pulsed radar system, which may, for example, be the same or similar to the system 120 of FIG. 3. Preferably, the radar system is adapted to employ IQ, or equivalent, demodulation. More preferably, the radar sensor 12 is designed to operate in the ISM (Industry Scientific and Medical) band at approximately 24 GHz. In typical embodiments, the sensor 12 is configured so that the detection region 16 is oriented in a substantially or generally horizontal or azimuth plane, or at least that the incident angle of reflected signals is measured in a substantially or generally horizontal or azimuth plane. In this connection, the terms horizontal and azimuth are intended to embrace directions that are substantially parallel with the ground where the apparatus 10 is located and where the detection region is defined.

The apparatus 10 further includes an analysis unit 18 for receiving signals from the radar sensor 12 concerning objects detected in the detection region 16. Typically, the signals provided to the analysis unit 18 from the radar sensor 12 indicate the distance of a detected object from the apparatus 10 (and more particularly from the sensor 12) and the incident angle of the received signal reflected from the object. The analysis unit 18 then evaluates whether or not the detected object warrants the raising of an alarm signal, as is described in more detail below. In this connection, it will be understood that the term "alarm signal" or "alarm event" as used herein is intended to embrace not only signals that cause audio and/or visual alarms, but also any other action, e.g. event reporting or recording, that may be taken upon detection of an object that is deemed to be crossing the boundary in a manner that warrants action being taken. In FIG. 1, an alarm unit 19 is shown which may be activated as necessary by the analysis unit 18. The alarm unit 19 may comprise an audio alarm and/or a light source. Alternatively, the analysis unit 19 may send a signal to one or more remote devices (not shown) indicating an alarm condition. The remote devices may include audio alarms and/or lights and/or a remote computer. The analysis unit 18 typically takes the form of a suitably programmed computer or microprocessor. In the embodiment shown in FIG. 1, the analysis unit 18 includes means for defining a boundary 18A, means for determining a path of an object 18B, means for performing an evaluation of the determined path 18C, means for raising an alarm 18D, means for determining a distance 18E, and means for determining an incident angle 18F.

In order to act as a boundary crossing detection system, the apparatus 10 defines a subregion of the detection region 16 as corresponding to the perimeter or boundary to be monitored. In FIG. 1, the boundary region is indicated as 50. In the preferred embodiment, the apparatus 10 also defines at least two further sub-regions, one being beyond the boundary region 50 with respect to the apparatus 10 and the other being between the boundary region 50 and the apparatus 10. These regions are shown respectively in FIG. 1 as a post-boundary region 52 and a pre-boundary region 54. Typically, each region 50, 52, 54 is defined in terms of distance or range from the apparatus 10 (and more particularly from the sensor 12). In a typical embodiment where there is a single sensor 12, the boundary region 50 is arc-like and may cover a range of distances, i.e. it may be a band boundary, or may cover a single specific distance, i.e. it may be a line boundary. The width of the band 50 may be varied to suit the application. The boundary region 50 is arranged to correspond with the perimeter of the region that it is desired to protect or monitor, e.g. an indoor area such as a room, or an outdoor area such as a garden or yard. The post-boundary and pre-boundary regions 52, 54 may be defined in terms of a respective band or, more conveniently, may be defined as comprising, respectively, the region beyond the boundary 50 and the region within the boundary 50. The regions 50, 52, 54 are conveniently defined by the analysis unit 18. Typically, the regions 50, 52, 54 are disposed in the same plane as the plane in which measurements/detections are made.

The analysis unit 18 is arranged to monitor, in particular, objects that are detected in the boundary region 50. In order to avoid false or undesirable alarms, the analysis unit 18 monitors the movement of an object before and/or after it is detected in the boundary region 50 to evaluate whether or not the object warrants the raising of an alarm signal. In one embodiment, the analysis unit 18 monitors the movement of an object only after it is detected in the boundary region 50. Monitoring of the movement of an object involves, in preferred embodiments, monitoring the incident angle of signals reflected by the object in the manner described above. Alternatively, or in addition, monitoring the movement of an object involves monitoring the transition of the object between sub-regions of the detection region 16. In preferred embodiments, the boundary region 50 is a band region rather then a line boundary, i.e. has width.

In a simple embodiment, the analysis unit 18 raises an alarm signal if it determines that an object crosses from the boundary region 50 to the pre-boundary region 54. Preferably, however, the analysis unit 18 raises an alarm signal if it determines that an object travels from the post boundary region 52 to the boundary region 50 and then to the pre-boundary region 54 (but not if the object travels from the boundary region 50 back to the post-boundary region 52 without having crossed into the pre-boundary region 54). This prevents false alarms in the case where an object starts in the pre-boundary region 54, crosses into the boundary region 50 and then back to the pre-boundary region 54. Optionally, the analysis unit 18 may, in an initialization mode, register all objects that it detects in the pre-boundary region 54, and optionally also objects in the boundary region 50, so that, if the analysis unit 18 subsequently detects that said objects enter the post-boundary region 52 and then return to the boundary or pre-boundary region 50, 54, no alarm is raised.

In order to help the analysis unit 18 track the movement of objects and to make more sophisticated evaluations concerning whether or not an alarm signal is warranted, it is preferred that the analysis unit 18 tracks or monitors the incident angle of signals reflected from the respective object Advantageously, this is performed in conjunction with monitoring of boundary crossing.

Tracking objects using incident angles is particularly useful for monitoring objects that are first detected by the apparatus 10 in the post-boundary region 52. If the analysis unit 18 determines that such an object is moving generally towards the protected area (e.g. towards the boundary region 50, or towards the pre-boundary region 54 or towards the sensor 12) and if the object enters the boundary region 50, then an alarm event may be raised. Alternatively, such movement may only cause an alarm if the object passes into the pre-boundary region 54. The general direction of movement of an object may be monitored over time, preferably from first detection, and the analysis unit 18 may use the detected general direction of movement to predict whether or not the object is on course to enter the pre-boundary region 54. If so, then an alarm may be raised when the object enters the boundary region 50. However, if the analysis unit determines that the path of the object will lead it into the boundary region 50 but not into the pre-boundary region 54, then an alarm is not raised when the object enters the boundary region 50 (but may be raised if the object does actually enter the pre-boundary region 54).

More generally, the analysis unit 18 may monitor the movement of an object and predict its path. When the object crosses the boundary (either enters the boundary region 50 when it is a band, or crosses the boundary 50 region when it is a line), the analysis unit 18 decides whether or not to raise an alarm depending on the predicted path of the object. Conveniently, the analysis unit 18 calculates a predicted linear path for the object. In some embodiments, the analysis unit 18 may elect not to raise an alarm even if the object enters, or is predicted to enter, the pre-boundary region 54. For example, this may be the case if the predicted path of the object indicates that it will pass into the post-boundary region 52 without having encroached significantly on the protected area (this may, for example, be assessed by calculating the distance (typically taken perpendicularly) of the predicted path from the sensor 12 and comparing the calculated distance with a threshold distance. Hence, by way of example, the analysis unit 18 may elect not to raise alarm in respect of objects traveling generally perpendicular to, or parallel with, the bore sight of the sensor 12, especially if their predicted path is sufficiently far away from the sensor 12 to satisfy said distance threshold. An evaluation may alternatively or additionally be made depending on a determined angle of inclination, or incidence, of the object's predicted path with respect to a reference axis, e.g. the bore sight of the sensor 12. If the angle of inclination, or incidence, meets a threshold requirement then an alarm may be raised (but typically only if it is also determined that the boundary 50 will also be traversed). This would allow, for example, objects travelling substantially perpendicular with the bore sight to be ignored.

In the preferred embodiment, the pre-boundary region 54 and post-boundary region 52 are defined as respective finite bands, one on either side of the boundary 50 (which itself may be a band or a line), such that one or more further sub-regions exist between the pre-boundary region 52 and the sensor 12, and beyond the post-boundary region 52 with respect to the sensor 12. Conveniently, the analysis unit only monitors the movement of objects that are detected in the pre-boundary and post-boundary bands 54, 52.

Figure 5:
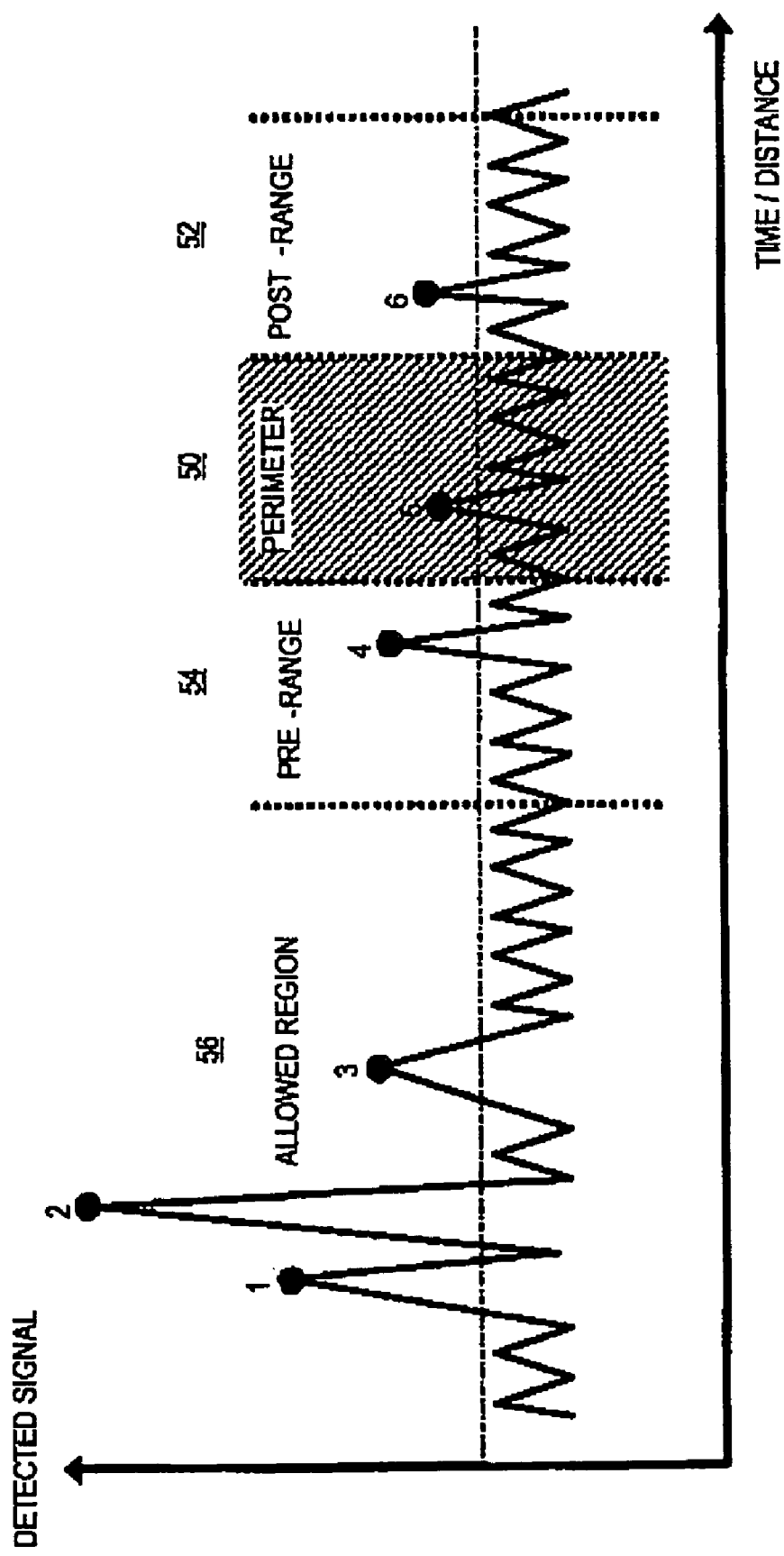
FIG. 5 is a graph illustrating detected signals in particular from the sum chain of the system of FIG. 2.
Figure 6:
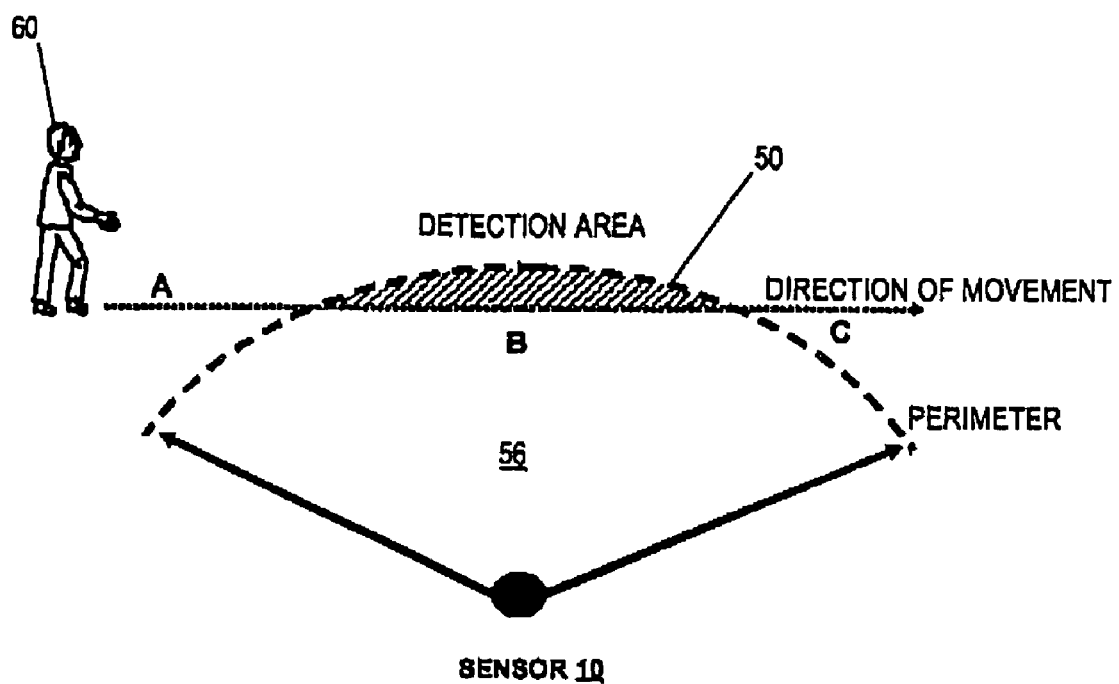
FIG. 6 is a schematic illustration of the detection field of the apparatus of FIG. 1.

FIGS. 5 to 7 provide some examples. FIG. 5 shows detected signal intensity against distance from the sensor 12 (equivalent to the time taken to receive the respective reflected signal). In this illustration, it is assumed that the circuit of FIG. 3 is used and so the signal shown in FIG. 5 is from the "sum" chain of the circuit (and from one channel, e.g. from the I channel where there is more than one channel). In this example, the pre-boundary, or pre-range, region is defined as a band such that a further sub region—an "allowed" region 56—is defined between the pre-boundary region 54 and the sensor 12 (in other embodiments, the allowed region 56 may be, or be part of, the pre-boundary region 54). Objects 1, 2 and 3 are detected, but do not trigger an alarm since they are within the allowed region 56. In the example of a protected garden, these could be objects or people within the garden, the edge of the garden corresponding with the boundary 50. Object 5 is in or at the boundary 50 and, conventionally, this would trigger an alarm. In this embodiment however, the analysis unit 18 is able to track this object over time and make a decision on whether or not to raise an alarm depending on whether the object is moving out of the protected area (i.e. an alarm is not sounded) or is moving towards the sensor (i.e. an alarm is sounded). Object 4, which is in the pre-boundary region 54 may be similarly tracked.

FIG. 6 shows another case where false readings are avoided. Here the object, or person 60, is moving perpendicular to the bore sight of the sensor 12. His predicted path crosses the boundary 50. Conventionally, this would lead to an alarm being raised. However, in this embodiment, the apparatus 10 can track the movement of the person and, having determined that they are not moving in the general direction of the sensor 12/apparatus 10, can elect not to raise an alarm. Hence, objects partially crossing the detection limits, but moving away from the sensor 12/apparatus 10 do not record a false alarm.

Figure 7A:
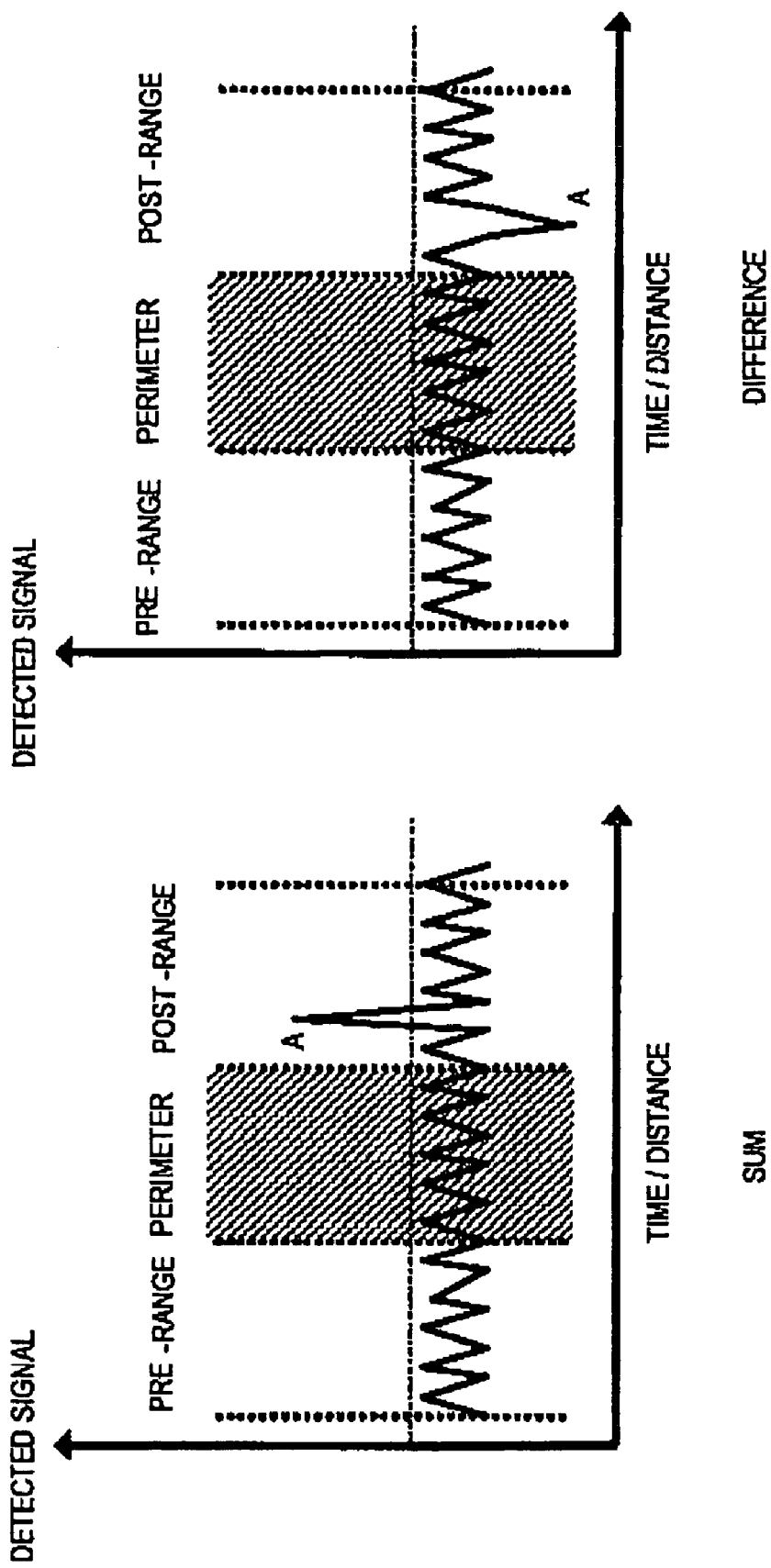
FIG. 7A is a graph illustrating detected signals for a person located in region A of FIG. 6.
Figure 7B:
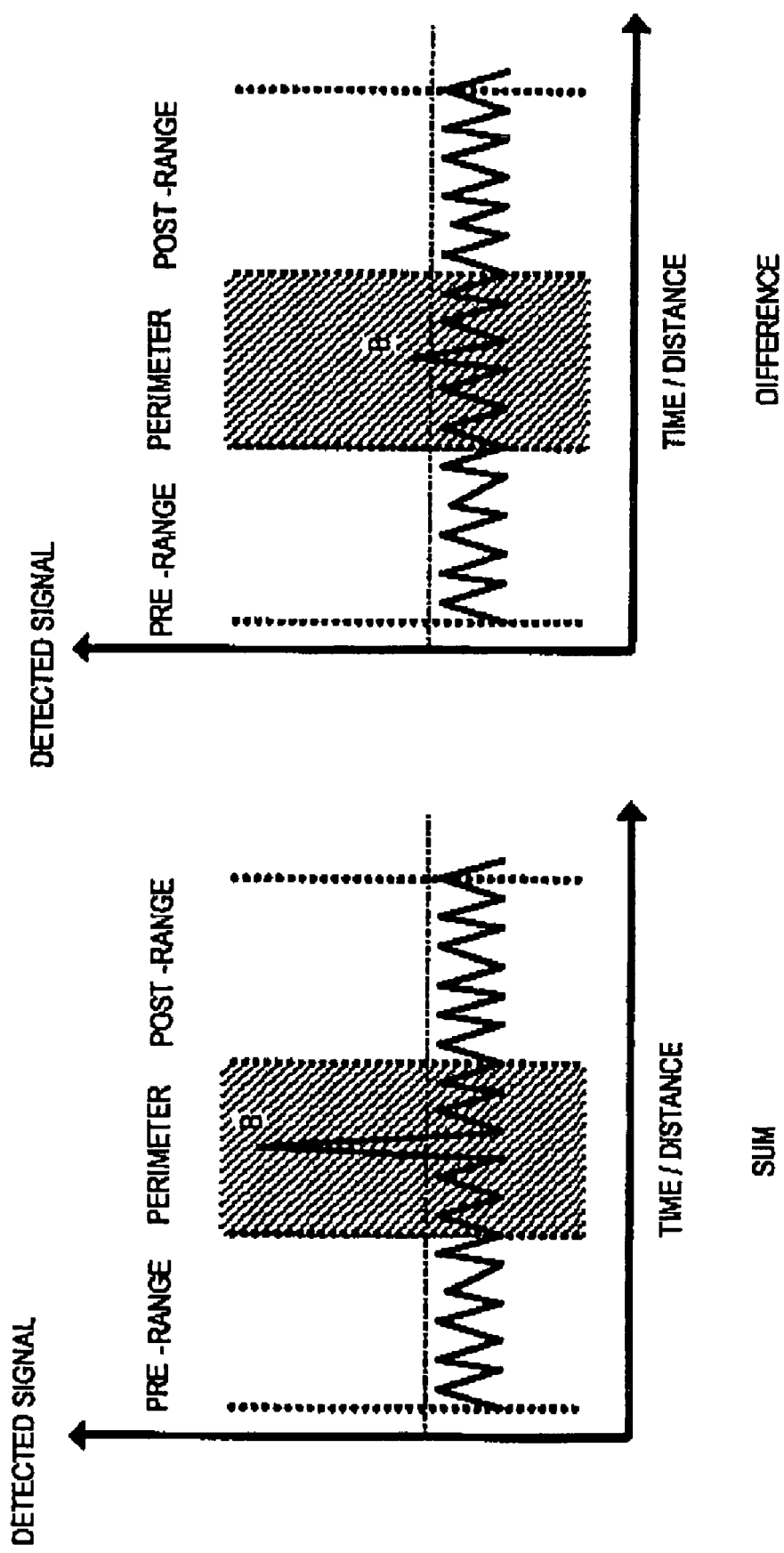
FIG. 7B is a graph illustrating detected signals for a person located in region B of FIG. 6.
Figure 7C:
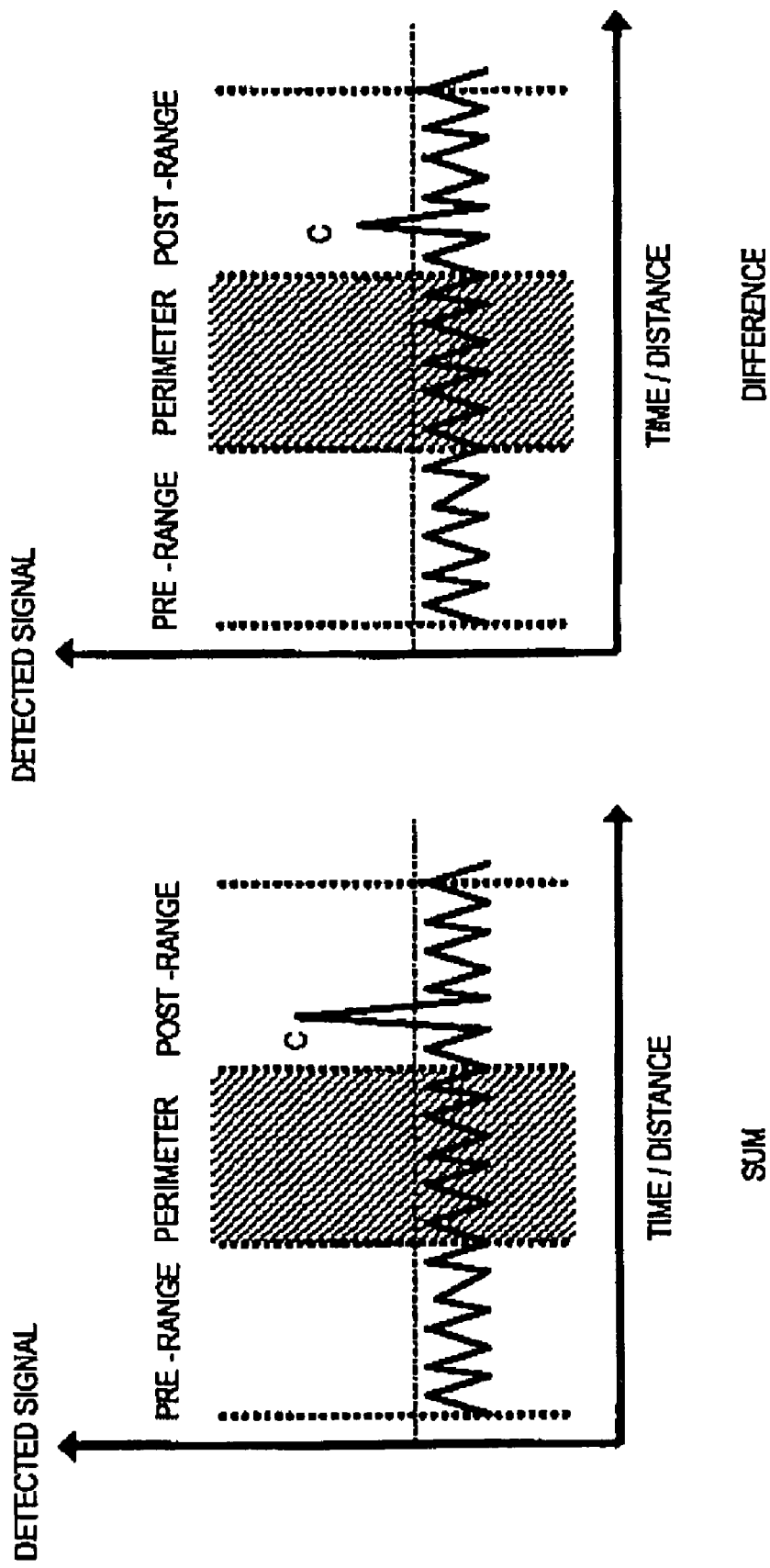
FIG. 7C is a graph illustrating detected signals for a person located in region C of FIG. 6.

By way of explanation, FIGS. 7A to 7C show the detected signals for both the "sum" chain (i.e. signal "+" in FIG. 3) and the "difference" chain (i.e. signal "−" in FIG. 3) for the person 60 when at locations A, B and C respectively as shown in FIG. 6. The detected signals shown in FIGS. 7A to 7C are for a single channel, e.g. the I channel, where more than one channel is present. From each of FIGS. 7A to 7C a respective ratio of the difference and sum signals can be calculated to determine the angular position of the person 60 with respect to the sensor 12 (or more particularly with respect to its bore sight). This information can be combined over time to determine a predicted path for the object/person conclude that the person 60 is moving across the protected area as opposed to towards the sensor 12. Hence, the analysis unit 18 may elect not to raise alarm when the boundary 50 is crossed from A to B. This is in contrast to a conventional system wherein an alarm would be raised as soon as the boundary 50 was crossed. It is noted that the phase or magnitude change in the difference signal from FIG. 7B to FIG. 7C indicates in this case that the target 60 has moved to the right of the sensor 12. At bore sight, FIG. 7C, the level of the difference signal should ideally be zero, although in practice small signal levels are detected.

Figure 8B:
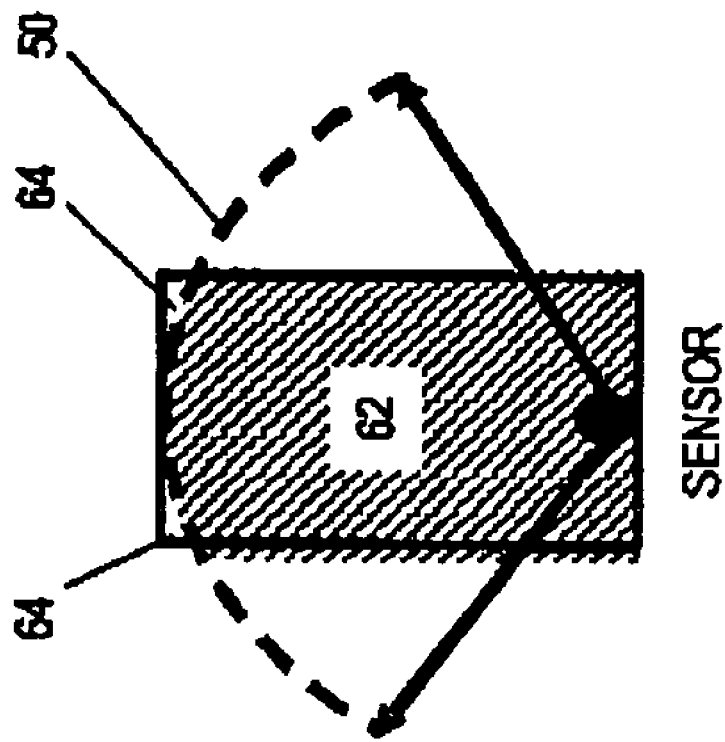
FIG. 8B is a schematic illustration of blind spots present in conventional detection systems.
Figure 8A:
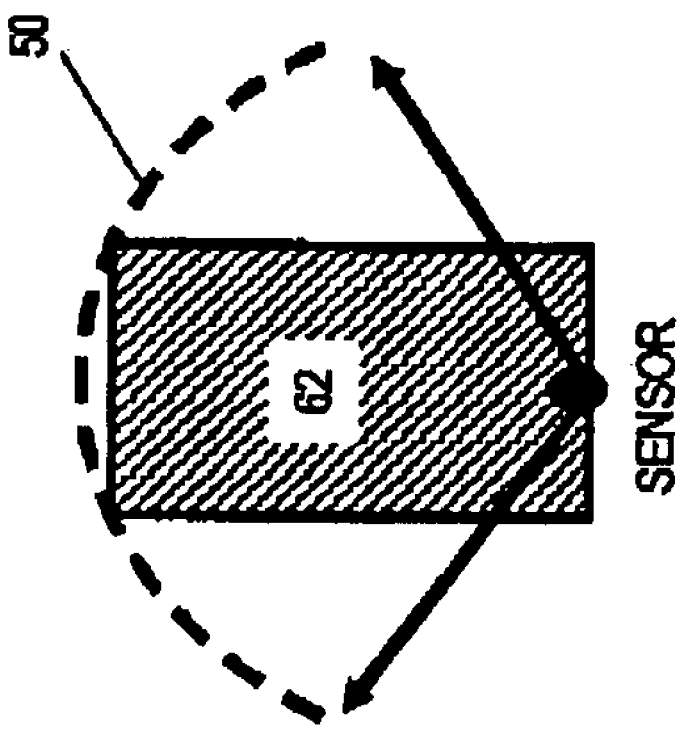
FIG. 8A is a schematic illustration of how systems embodying the invention may be used to eliminate blind spots.

Referring now to FIGS. 8A and 8B, it can be seen that apparatus embodying the invention can eliminate or reduce blind spots in the protected area. A typical protected area 62 is shown and is substantially rectangular in shape. The apparatus 10 can be arranged so that the boundary 50 extends beyond the limits or periphery of the protected area 62 (as illustrated in FIG. 8A). False detections caused by objects that cross the boundary 50 but do not enter, or are not headed for, the protected area 62, can be avoided by the techniques described above. Conventionally, to avoid false detections, the sensor would be arranged such that the boundary does not extend beyond the periphery of the protected area 62 (as shown in FIG. 8B). However, this leaves blind spots 64 in the protected area 62 that are not covered by the sensor.

In another embodiment, the apparatus 10 may be used to monitor objects within a protected area and to raise alarm if any object leaves the protected area. Similar techniques to those described above may be employed except that the analysis unit 18 is configured to raise the alarm if it determines that the object's predicted path would cause it to enter or cross the boundary region 50 and/or enter the post-boundary region 52 and/or pass beyond the post-boundary region 52. Conveniently, the analysis unit 18 begins to monitor objects once they are detected in the pre-boundary region 54. By way of example, target 4 in FIG. 5 could be a child in a garden, whose direction of motion is monitored in the pre-boundary region 54.

In general, the level or intensity of a reflected signal received at the sensor 12 depends on the size of the object from which it is reflected. In all embodiments, it is preferred that the level or intensity of a reflected signal that is deemed to constitute a detected object is adjustable, conveniently by the analysis unit 18 and typically by user control, so that the apparatus 10 may discriminate amongst objects to be detected by their size. For example, in some embodiments it may be desirable to detect vehicles but not people, and vice versa.

An ON/OFF switch may added to the apparatus 10 which can be used to override the normal operating conditions of the apparatus 10. This switch would allow an override facility when the apparatus 10 is nominally ON or OFF.

The apparatus 10 may be in communication with an image or video recording system, e.g. a closed circuit television (CCTV) system so that alarm events may be recorded. For example, the apparatus 10 may be arranged to activate the image/video recording system when an object enters the boundary region, the pre-boundary region or post-boundary region.

In an alternative application, the apparatus 10 may be provided on an automotive vehicle, e.g. a car, and may be arranged such that the bore sight of the antenna projects forwardly of the vehicle, preferably substantially parallel with, or collinear with the direction of movement of the vehicle.

The invention is not limited to the embodiments described herein which may be modified or varied without departing from the scope of the invention.

The invention claimed is:

1. A boundary monitoring apparatus comprising: a radar device arranged to transmit a signal into a detection region and to detect an object in said detection region upon receipt of a reflected signal from said object; means for defining a boundary in said detection region; means for determining a path of said object in the detection region; means for performing an evaluation to determine if said path intersects with said boundary; and means for raising an alarm depending on the evaluation, wherein said means for performing an evaluation is arranged to determine a minimum distance within said boundary of said path of said object from said radar device or other reference location, and wherein said means for raising an alarm raises an alarm if said path of the object is determined to intersect said boundary and if said minimum distance of said path is less than a threshold value, and does not raise said alarm if said path of the object is determined to intersect said boundary and if said minimum distance of the path is greater than said threshold value.

2. An apparatus as claimed in claim 1, wherein said reflected signal is received during use by said object detection device at an incident angle, the apparatus including means for determining said incident angle.

3. An apparatus as claimed in claim 2, wherein said apparatus includes means for determining a distance of said object from said radar device, and wherein determination of said path by said means for determining a path is based on respective incident angles and respective distances determined by said means for determining a distance determined for said object over time.

4. An apparatus as claimed in claim 1, wherein said radar device comprises first and second receiving antennas each receiving, in use, a respective reflected signal from a detected object; and a summation and subtraction unit for summing and subtracting the respective reflected signals to produce, respectively, a sum reflected signal and a difference reflected signal.

5. An apparatus as claimed in claim 4, wherein an incident angle for the detected object is determined from a ratio of said sum reflected signal and said difference reflected signal.

6. An apparatus as claimed in claim 1, wherein said means for determining a path is arranged to determine a linear path for said detected object.

7. An apparatus as claimed in claim 1, wherein said means for determining a path is arranged to determine a linear path for said detected object, and said means for performing an evaluation is arranged to determine an angle of inclination of the determined path of said object from a reference axis, and wherein said means for raising an alarm raises the alarm if the path of the object is determined to intersect said boundary and if said determined angle meets an angle threshold requirement, and does not raise said alarm if the path of the object is determined to intersect said boundary and if said determined angle does not satisfy said angle threshold requirement.

8. An apparatus as claimed in claim 1, further including means for defining a post-boundary region beyond said boundary with respect to said radar device, the apparatus being arranged to monitor the movement of objects detected in the post-boundary region.

9. An apparatus as claimed in claim 1, further including means for defining a pre-boundary region between said boundary and said radar device, the apparatus being arranged to monitor the movement of objects detected in the pre-boundary region.

10. An apparatus as claimed in claim 1, wherein, in respect of an object first detected outside of said boundary, said means for performing an evaluation is arranged to determine if said determined path indicates that said object is travelling towards the apparatus.

11. An apparatus as claimed in claim 1, wherein, in respect of an object first detected inside of said boundary, said means for performing an evaluation is arranged to determine if said determined path indicates that said object is travelling away from the apparatus.

12. An apparatus as claimed in claim 1, further including means for adjusting a size threshold for detectable objects.

13. An apparatus as claimed in claim 1, wherein said means for determining a path is arranged to monitor movement of said object and to predict said path based on said monitored movement.

14. A boundary monitoring apparatus as claimed in claim 1, wherein said means for raising an alarm is arranged not to raise said alarm until said radar device determines that said object has intersected said boundary.

15. A method of monitoring a boundary in an apparatus comprising a radar device arranged to transmit a signal into a detection region and to detect an object in said detection region upon receipt of a reflected signal from said object, the method comprising defining a boundary in said detection region; determining a path of said object in the detection region; performing an evaluation to determine if said path intersects with said boundary; determining a minimum distance within said boundary of said path of said object from said radar device or other reference location; and raising an alarm if said path of the object is determined to intersect said boundary and if said minimum distance of the path is less than a threshold value, and not raising said alarm if said path of the object is determined to intersect said boundary and if said minimum distance of the path is greater than said threshold value.

16. A boundary monitoring apparatus comprising: a radar device arranged to transmit a signal into a detection region and to detect an object in said detection region upon receipt of a reflected signal from said object; means for defining a boundary in said detection region; means for determining a linear path of said object in the detection region; means for performing an evaluation of the determined path to determine if the path intersects with said boundary of the object; and means for raising an alarm depending on the evaluation, wherein said means for performing an evaluation is arranged to determine an angle of inclination of said linear path of said object from a reference axis, and wherein said means for raising an alarm raises an alarm if said path of the object is determined to intersect said boundary and if said determined angle meets an angle threshold requirement, and does not raise said alarm if the path of the object is determined to intersect said boundary and if said determined angle does not satisfy said angle threshold requirement.

17. A boundary monitoring apparatus as claimed in claim 16, wherein said means for performing an evaluation is arranged to determine a minimum distance within said boundary of the determined path of said object from said radar device or other reference location, and said means for raising an alarm raises said alarm if the path of the object is determined to intersect said boundary and if said minimum distance of the path is less than a threshold value and does not raise said alarm if the path of the object is determined to intersect said boundary and if said minimum distance of the path is greater than said threshold value.

18. A boundary monitoring apparatus as claimed in claim 17, wherein said reference axis is substantially parallel with a line of sight of said radar device, said means for raising an alarm is arranged not to raise said alarm if said determined path is substantially perpendicular to said reference axis and if said minimum distance is greater than said threshold value.

19. A boundary monitoring apparatus as claimed in claim 18, wherein said means for raising an alarm is arranged not to raise said alarm until said radar device determines that said object has intersected said boundary.

20. A method of monitoring a boundary in an apparatus comprising: a radar device arranged to transmit a signal into a detection region and to detect an object in said detection region upon receipt of a reflected signal from said object, the method comprising defining a boundary in said detection region; determining a linear path of said object in the detection region; performing an evaluation to determine if said path intersects with said boundary; determining an angle of inclination of the determined linear path of said object from a reference axis; raising an alarm if said path of the object is determined to intersect said boundary and if said determined angle meets an angle threshold requirement; and not raising said alarm if the path of the object is determined to intersect said boundary and if said determined angle does not satisfy said angle threshold requirement.

\* \* \* \* \*